United States Patent

Kanda et al.

[15] 3,656,125

[45] Apr. 11, 1972

[54] WRITING CHECKING SYSTEM

[72] Inventors: Kaoru Kanda, Yokohama; Tadahiro Kobayashi, Kawasaki, both of Japan

[73] Assignee: Fujitsu, Limited, Kawasaki, Japan

[22] Filed: Nov. 9, 1970

[21] Appl. No.: 87,882

[30] Foreign Application Priority Data

Nov. 20, 1969 Japan....................................44/93133

[52] U.S. Cl.......................................................340/174.1 B

[51] Int. Cl.......................................G11b 27/36, G11b 5/46

[58] Field of Search..............340/174.1 B, 174.1 G, 174.1 H, 340/146.1

[56] References Cited

UNITED STATES PATENTS

| | | | |
|---|---|---|---|
| 3,359,548 | 12/1967 | Yoshii et al. | 340/174.1 B |
| 3,444,541 | 5/1969 | Irwin | 340/174.1 B |

*Primary Examiner*—Bernard Konick
*Assistant Examiner*—Vincent P. Canney
*Attorney*—Curt M. Avery, Arthur E. Wilfond, Herbert L. Lerner and Daniel J. Tick

[57] ABSTRACT

Data recorded on magnetic tape is read by a read head after a specific constant period of time determined by the interval between the write head and the read head and the transfer speed of the magnetic tape. The writing checking system determines whether or not the data written on the magnetic tape by the write head may be read by the read head after a specific predetermined period of time. There is a period of time between the writing of the data on the magnetic tape by the write head and the passage of the data under the read head. Such period of time is utilized to predetermine the time at which the data should not be read by the read head and the time at which the data should be read by the read head and to check whether or not the data read by the read head satisfies the predetermined condition, thereby enhancing the reliability of the writing.

5 Claims, 3 Drawing Figures

Patented April 11, 1972

3,656,125

2 Sheets-Sheet 2

WRITING CHECKING SYSTEM

DESCRIPTION OF THE INVENTION

The invention relates to a writing checking system. More particularly, the invention relates to a writing checking system for a magnetic tape unit.

The magnetic tape unit has a record medium, a write head in operative proximity with the record medium for writing on the record medium and a read head in operative proximity with the record medium for reading writing on the record medium. Writing is intended to convey the magnetic recording of data on the record medium, which preferably comprises a magnetic tape, and reading is intended to indicate the readout of data magnetically recorded on the magnetic tape. Binary data is written or recorded on the magnetic tape by the write head and is read by the read head. The writing checking system of the invention checks the write head and the circuit of the write head.

A known checking system for a magnetic tape unit has a write head and a read head. In the known checking system, data recorded on the magnetic tape by the write head is read by the read head to check whether or not the data is correctly recorded on the magnetic tape. This checking system, however, merely checks the recorded data and does not check the write head, the write head circuit, or the circuit, or the write head.

Known checking systems may be classified in three systems. In one system, the checking system checks whether or not data is recorded on a magnetic tape, so that binary signals 1 and 0 indicating the recorded data may be correctly differentiated from each other. In another system, the checking system is a parity checking system and checks whether or not each column of the recorded data has the data bit corresponding to the parity check bit determined by whether the number of data bits of 1 or 0 of each of the columns of the data block is odd or even. In a third system, the checking system is an echo checking system and is based upon the principle that the constitution of the bit is so determined that more than 1 bit always exist in the data of one column of the data block. The echo checking system checks whether or not more than one 1 bit always exist in each of the columns of the data block recorded on a magnetic tape.

In the aforedescribed three checking systems, if the write head and the write circuit are faulty, even if the write start command is supplied, the old data recorded on the magnetic tape is not erased, and no new data may be recorded on the tape. The read head thus reads the old data on the tape and the old data is that which is checked in the aforedescribed three systems. If there is no error in the old data, therefore, a fault in the write head or the write circuit cannot be detected.

The principal object of the invention is to provide a new and improved writing checking system.

An object of the invention is to provide a writing checking system which overcomes the disadvantages of the known checking systems.

An object of the invention is to provide a writing checking system which checks faults in the write head and the write circuit with accuracy.

An object of the invention is to provide a writing checking system which checks faults in the write head and the write circuit with efficiency, effectiveness and high reliability.

In accordance with the invention, data is recorded on a magnetic tape of a magnetic tape unit by a write head and the data is read by a read head after a specific constant period of time determined by the interval between the write head and the read head and the transverse feed of the magnetic tape. It is determined whether or not the data written by the write head may be read by the read head after a specific predetermined period of time. A period of time elapses between the writing of data on the magnetic tape of the write head and the passing of the data under the read head. Such period of time is utilized to predetermine the time at which the data should not be read by the read head and the time at which the data should be read and to check whether or not the data read by the read head satisfies the predetermined condition and thereby enhances the reliability of the writing.

In accordance with the invention, a writing checking system for a magnetic tape unit, having a record medium, a write head in operative proximity with the record medium for writing on the record medium and a read head in operative proximity with the record medium for reading writing on the record medium, comprises an output terminal. A first circuit coupled to the read head and connected to the output terminal produces an error signal at the output terminal if a read signal is read during a first period of time T1 after the start of writing recorded on the record medium. A second circuit connected to the first circuit produces an error signal at the output terminal if no read signal is read after the expiration of a second period of time T2 after the expiration of the first period of time T1. A first input terminal supplies a write stop command. A third circuit connected to the first input terminal and the second circuit produces an error signal at the output terminal if no read signal is read during the first period of time T1 after the end of writing recorded on the record medium. A fourth circuit connected to the third circuit and first circuit produces an error signal at the output terminal if a read signal is read after the expiration of the second period of time T2 after the expiration of the first period of time T1.

A second input terminal supplies a write start command. The first circuit comprises a first delay circuit having an output and an input coupled to the read head and to the second input terminal for providing a delay time equal to the first period of time T1. The first delay circuit is energized by a write start command at the second input terminal. A first OR gate has an output, a first input connected to the output of the first delay circuit and a second input coupled to the read head. A first flip flop has a set input, a reset input connected to the output of the first delay circuit and a set output. Read start means connected to the set input of the first flip flop supplies a read start signal thereto. A first AND gate has a first input, a second input connected to the set output of the first flip flop and an output. Read signal means connected to the first input of the first AND gate supplies read signals thereto. A second OR gate has a first input connected to the output of the first AND gate, a second input and an output connected to the output terminal.

An inverter has an input connected to the read signal means and an output. The second circuit comprises a second delay circuit having an input connected to the output of the first delay circuit of the first circuit and an output for providing a delay time equal to the second period of time T2. The second delay circuit is energized by the output of the first delay circuit. A second flip flop has a set input connected to the output of the second delay circuit, a reset input coupled to the first input terminal and a set output. A second AND gate has a first input connected to the output of the inverter, a second input connected to the set output of the second flip flop and an output connected to the second input of the second OR gate of the first circuit.

The third circuit comprises a third delay circuit having an input connected to the first input terminal and an output for providing a delay time equal to the first period of time T1. The third delay circuit is energized by a write stop command at the first input terminal. The third circuit includes the second flip flop of the second circuit. The output of the third delay circuit is connected to the reset input of the second flip flop. The third circuit includes the second AND gate of the second circuit and the second OR gate of the first circuit.

The fourth circuit comprises a fourth delay circuit having an input connected to the output of the third delay circuit of the third circuit and an output for providing a delay time equal to the second period of time T2. The fourth delay circuit is energized by the output of the third delay circuit. A third OR gate has a first input connected to the read signal means, a second input connected to the output of the fourth delay circuit and an output connected to the set input of the first flip flop of the first circuit. The fourth circuit includes the first AND gate of the first circuit and the second OR gate of the first circuit.

In order that the invention may be readily carried into effect, it will now be described with reference to the accompanying drawings, wherein.

Figure 1:
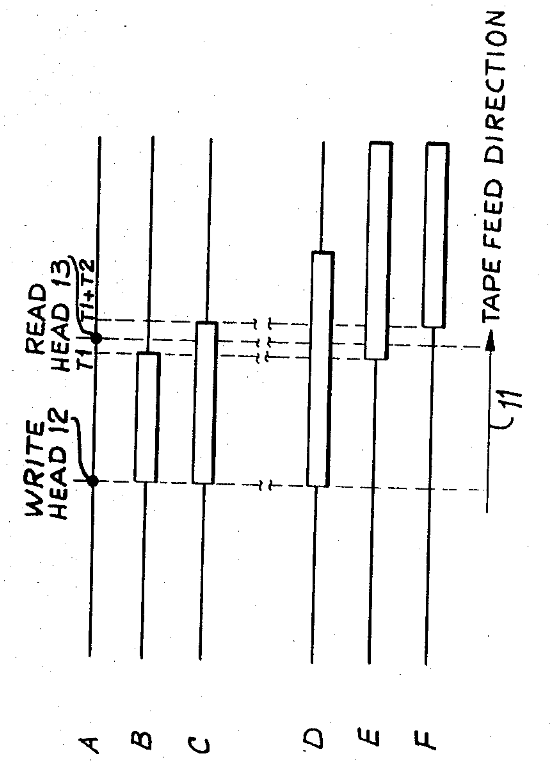
FIG. 1 is a graphical presentation illustrating the operation of the writing checking system of the invention.

In FIG. 1, each of the curves A, B, C, D, E and F is a time chart illustrating the variation of data recorded on a magnetic tape between the start of writing and the end of reading. The curves A to F of FIG. 1 explain the time relation between the read head and the recorded data as data is written or recorded on the magnetic tape by the write head. The record medium or magnetic tape is moved in the direction of an arrow 11.

The writing is undertaken by a write head 12 and is started as shown in the curve A of FIG. 1. The condition of curve B of FIG. 1 is reached after the expiration of a first time period T1. In curves A and B of FIG. 1, data is not read, since such data has not yet reached the read head 13. In other words, the read head should not read in the conditions illustrated in the curves A and B of FIG. 1. If data is read in the conditions illustrated by the curves A and B of FIG. 1, this indicates that the old data has not been erased, but is still recorded on the magnetic tape and that the writing operation is thus faulty.

The curve C of FIG. 1 illustrates the condition reached after the expiration of a second time period T2 after the condition of the curve B of FIG. 1. In the condition of the curve C of FIG. 1, data should be read by the read head, since such data has reached said read head. If data is not read in the condition illustrated by the curve C of FIG. 1, this indicates that there is a fault in the writing circuit and that said writing circuit is not functioning properly. If the data is written properly or smoothly, said data should be read out in the condition illustrated by the curve C of FIG. 1.

If data is written or recorded continuously, such data is read by the read head as indicated in the curve D of FIG. 1, with a difference in the delay time. When the written data end, no data is written by the write head, but data is read by the read head until the expiration of the first period of time T1, that is, until the condition illustrated by the curve E of FIG. 1 is reached. After the condition of the curve E of FIG. 1 is reached, the condition of the curve F of FIG. 1 is attained after the expiration of the second period of time T2. No data is read out thereafter.

The period of time between the first time period T1 and the first and second time periods T1 +T2 is utilized for the elimination of skew of data recorded on the magnetic tape and erroneous reading due to expansion and compression of said tape. The writing checking system of the invention permits the utilization of the delay times or the first and second time periods T1 and T2 to check whether or not the written data is correctly read and to determine whether or not the writing is performed properly.

Figure 2:
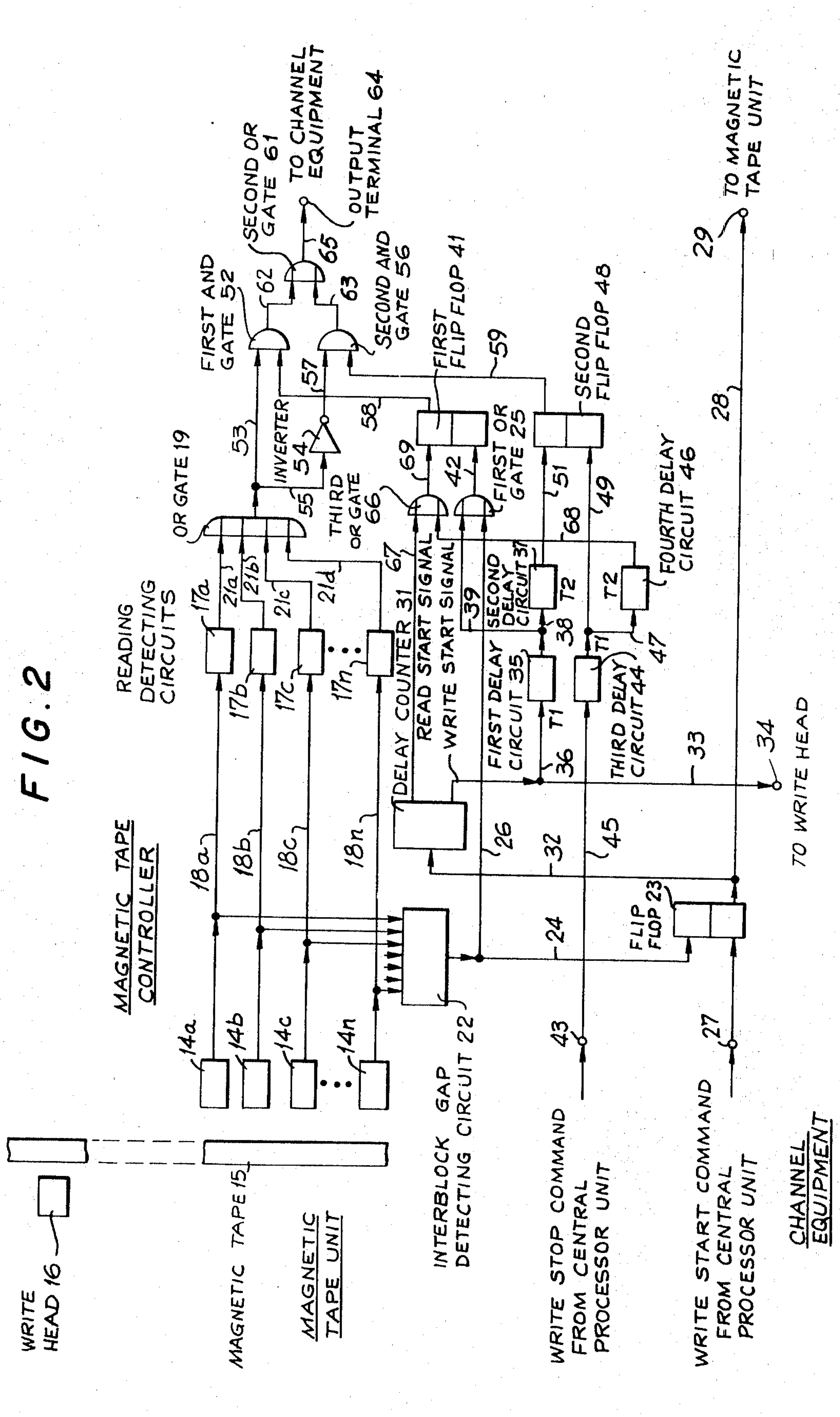
FIG. 2 is a block diagram of an embodiment of the writing checking system of the invention.

In FIG. 2, a plurality of read heads 14*a*, 14*b*, 14*c* ... 14*n* are positioned in operative proximity with a magnetic tape 15. A write head 16 is also positioned in operative proximity with the magnetic tape 15. Each of the read heads reads the data recorded or written in a corresponding one of a plurality of tracks (not shown in FIG. 2) of the magnetic tape 15. Each of a plurality of reading detecting circuits is connected to a corresponding one of the read heads 14*a* to 14*n*. Thus, a reading detecting circuit 17*a* has an input connected to the output of the read head 14*a* via a lead 18*a*.

A reading detecting circuit 17*b* has an input connected to the output of the read head 14*b* via a lead 18*b*. A reading detecting circuit 17*C* has an input connected to the output of the read head 14*C* via a lead 18*c*. A reading detecting circuit 17*n* has an input connected to the output of the read head 14*n* via a lead 18*n*.

The output of the reading detecting circuit 17*a* is connected to a first input of an OR gate 19 via a lead 21*a*. The output of the reading detecting circuit 17*b* is connected to a second input of the OR gate 19 via a lead 21*b*. The output of the reading detecting circuit 17*c* is connected to a third input of the OR gate 19 via a lead 21*c*. The output of the reading detecting circuit 17*n* is connected to an $n^{th}$ input of the OR gate 19 via a lead 21*n*.

An interblock gap detecting circuit 22 has a plurality of inputs, each of which is connected to a corresponding one of the leads 18*a* to 18*n*. The interblock gap detecting circuit 22 functions to detect the gaps between the data blocks recorded on the magnetic tape 15. The output of the interblock gap detecting circuit 22 is connected in common to the set input of a flip flop 23, via a lead 24, and the second input of a first OR gate 25 via a lead 26. The flip flop 23 has a reset input connected to a second input terminal 27 to which write start commands are supplied from the central processor unit (not shown in FIG. 2). The flip flop 23 has a reset output connected in common to the magnetic tape unit via a lead 28 and an output terminal 29 and to the input of a delay counter 31 via a lead 32.

The delay counter 31 functions to determine the extent of the delay. The magnetic tape unit comprises the magnetic tape 15, the read heads 14*a* to 14*n* and the write head 16. Each of the reading detecting circuits 17*a* to 17*n* produces an output signal 1 when the read head to which it is connected reads a signal in the corresponding track of the magnetic tape 15. Each of the reading detecting circuits 17*a* to 17*n* produces an output signal 0 when the read head to which it is connected does not read a signal in the corresponding track of the magnetic tape 15.

The delay counter 31 has an output connected in common to the write head 16 via a lead 33 and an output terminal 34 and to the input of a first delay circuit 35 via a lead 36. The output of the first delay circuit 35 is connected in common to the input of a second delay circuit 37 via a lead 38 and to the first input of the first OR gate 25 via a lead 39. The first OR gate 25 has an output connected to the reset input of a first flip flop 41 via a lead 42.

A write stop command is supplied to an input terminal 43 from the central processor unit (not shown in FIG. 2). The input terminal 43 is connected to the input of a third delay circuit 44 via a lead 45. The output of the third delay circuit 44 is connected in common to the input of a fourth delay circuit 46, via a lead 47, and to the reset input of a second flip flop 48 via a lead 49. The output of the second delay circuit 37 is connected to the set input of the second flip flop 48 via a lead 51.

The output of the OR gate 19 is connected in common to a first input of a first AND gate 52, via a lead 53, and to the input of an inverter 54 via a lead 55. The output of the inverter 54 is connected to a first input of a second AND gate 56 via a lead 57. The set output of the first flip flop 41 is connected to the second input of the first AND gate 52 via a lead 58. The set output of the second flip flop 48 is connected to the second input of the second AND gate 56 via a lead 59.

The output of the first AND gate 52 is connected to a first input of a second OR gate 61 via a lead 62. The output of the second AND gate 56 is connected to the second input of the second OR gate 61 via a lead 63. An output terminal 64 is connected to the output of the second OR gate 61 via a lead 65.

Another output of the delay counter 31 is connected to a first input of a third OR gate 66 via a lead 67. The output of the fourth delay circuit 46 is connected to the second input of the third OR gate 66 via a lead 68. The output of the third OR gate 66 is connected to the set input of the first flip flop 41 via a lead 69. The delay counter 31 functions to supply a read start signal to the first input of the third OR gate 66 via the lead 67 and to supply a write start signal to the write head 16 and to the first delay circuit 35.

Each of the first delay circuit 35 and the third delay circuit 44 provides a delay time which is the first time period T1 (FIG. 1). Each of the second delay circuit 37 and the fourth delay circuit 46 provides a delay time which is the second period of time T2 (FIG. 1). Each of the first, second, third and fourth delay circuits 35, 37, 44 and 46 may comprise a monostable multivibrator.

If a write start command is supplied from the central processor unit (not shown in FIG. 2) to the channel equipment (not shown in FIG. 2) said write start command is supplied to the second input terminal 27, via which it is supplied to the reset input of the flip flop 23. The flip flop 23 is reset by the write start command supplied to the second input terminal 27 and produces a tape driving signal at its reset output. The tape driving signal produced by the flip flop 23 is supplied via the lead 28 and the output terminal 29 to the magnetic tape unit and starts the driving of the magnetic tape 15. The tape driving signal is simultaneously supplied to the input of the delay counter 31 via the lead 32 and energizes said delay counter.

When the delay counter 31 is energized by the tape driving signal at the reset output of the flip flop 23, said delay counter 31 produces a read start signal in the lead 67. The read start signal is transferred from the delay counter 31 to the set input of the first flip flop 41 via the lead 67, the third OR gate 66 and the lead 69. The write start signal thus sets the first flip flop 41. The delay counter 31 produces a write start signal in its output lead 33. The write start signal is transreferred to the reset input of the first flip flop 41 via the lead 36, the first delay circuit 35, the lead 39, the first OR gate 25 and the lead 42. The write start signal from the delay counter 31 thus resets the first flip flop 41 after the expiration of the first delay time T1. The write start signal is simultaneously supplied to the write head 16 via the lead 33 and the output terminal 34.

The write start signal starts the writing or recording of data on the magnetic tape 15 by the write head 16, and resets the first flip flop 41 after the expiration of the first time period or delay time T1, as hereinbefore described, thereby cutting off the output at the set output of said first flip flop. An error signal is provided at the output terminal 64 and is supplied to the channel equipment, if read signals are supplied by one of the read heads 14a to 14n during the period of time between the instant that the first flip flop 41 is set by the read start signal and the instant that said first flip flop is reset by the write start signal, which period of time is that between the start of recording of data on the magnetic tape 15 by the write head 16 and the time that the recorded data reaches the read head.

When the first flip flop 41 is in its reset condition, after the second period of time or delay time T2 has expired, the second flip flop 48 is set by the write start signal via the lead 36, the first delay circuit 35, the lead 38, the second delay circuit 37 and the lead 51. Even if read signals are provided by each of the read heads **14*a* to 14*n*, one or all of the outputs of the reading detecting circuits 17*a* to 17*n* becomes 1 and the OR gate 19 produces an output signal at its output. The output signal of the OR gate 19 is converted by the inverter 54 to no signal, so that no signal is supplied to the first input of the second AND gate 56 via the lead 57 from said inverter. The second AND gate 56 is thus in its non-conductive condition, so that it does not transfer the set output signal provided by the second flip flop 48 to the second input of said second AND gate via the lead 59. Thus, there is no error signal provided at the output terminal 64**.

If a write stop command is supplied from the central processor unit (not shown in FIG. 2) to the channel equipment (not shown in FIG. 2) said write stop command is supplied to the first input terminal 43. The write stop command or signal is supplied to the magnetic tape controller. The write stop signal is supplied to the reset input of the second flip flop 48 via the first input terminal 43, the lead 45, the third delay circuit 44 and the lead 49. The write stop signal is thus delayed by the first period of time or delay time T1 and then resets the second flip flop 48. When the second flip flop 48 is reset, the output signal at its set output is cut off. The reading of the data recorded on the magnetic tape 15 is thus continued for the first time period or delay period T1 after the stopping of the writing or recording on the magnetic tape 15 by the write head 16.

No error signal is provided at the output terminal 64 if one of the read heads **14*a* to 14*n* reads during the second period of time T2 after the expiration of the first period of time T1. After the expiration of the second period of time T2, the first flip flop 41 is set by the write stop signal via the first input terminal 43, the lead 45, the third delay circuit 44, the lead 47, the fourth delay circuit 46, the lead 68, the third OR gate 66 and the lead 69. Thus, if a read signal is supplied to the first AND gate 52 via the OR gate 19 and the lead 53, said first AND gate transfers an error signal to the output terminal 64, since the first flip flop 41 is set. The error signal at the output terminal 64, when the first flip flop 41** is set, indicates that the writing is not operating properly or correctly. The error signal is provided because there should be no data recorded where the writing has not occurred.

When the read heads **14*a* to 14*n* finish reading the data recorded on the magnetic tape 15 by the write heads 16, the interblock gap detecting circuit 22 produces an output signal to terminate the tape driving signals. The output signal of the interblock gap detecting circuit 22 is supplied to the reset input of the first flip flop 41 via the lead 24, the lead 26, the OR gate 25 and the lead 42, and resets said first flip flop. The output signal of the interblock detecting circuit 22 is also supplied to the set input of the flip flop 23 via the lead 24, and sets said flip flop. The output signal of the interblock gap detecting circuit 22 thus cuts off the output signal of the flip flop 23 and the output signal of the first flip flop 41. This completes the operation of the writing checking system of FIG. 2. The error signal provided at the output terminal 64** is recorded in a memory circuit of the channel equipment (not shown in FIG. 2) and causes the rewriting of the data by executing the program.

The writing checking system of the invention always indicates with precision whether or not the writing operation is performed correctly or properly. The utilization of the writing checking system of the invention for controlling a magnetic tape unit in a data processing system considerably improves the reliability of the entire data processing system including the magnetic tape unit.

Figure 3:
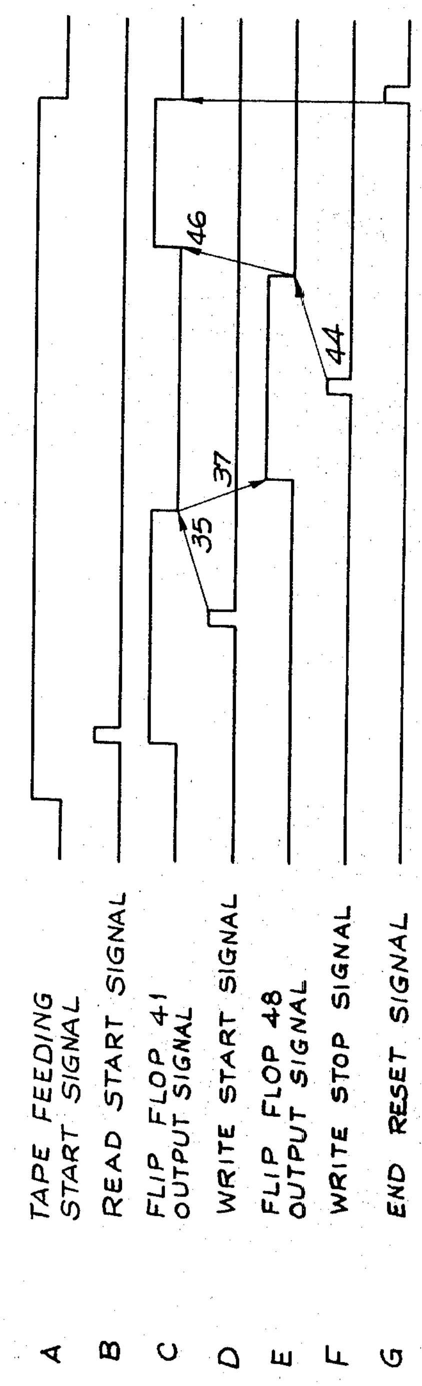
FIG. 3 is a graphical presentation of signals appearing at different points in the circuit of FIG. 2.

Curve A of FIG. 3 shows the tape feeding start signal provided at the output terminal 29 of FIG. 2. Curve B of FIG. 3 illustrates the read start signal provided by the delay counter 31 in the lead 67 of FIG. 2. Curve C of FIG. 3 shows the output signal of the flip flop 41 of FIG. 2.

Curve D of FIG. 3 illustrates the write start signal provided by the delay counter 31 in the lead 33 of FIG. 2. Curve E of FIG. 3 shows the output signal of the second flip flop 48 of FIG. 2. Curve F of FIG. 3 shows the write stop signal supplied to the first input terminal 43 of FIG. 2. Curve G of FIG. 3 illustrates the end reset signal supplied at the output of interblock gap detecting circuit 22 of FIG. 2.

While the invention has been described by means of a specific example and in a specific embodiment, we do not wish to be limited thereto, for obvious modifications will occur to those skilled in the art without departing from the spirit and scope of the invention.

We claim:

1. A writing checking system for a magnetic tape unit having a record medium, a write head in operative proximity with the record medium for writing on the record medium and a read head in operative proximity with the record medium for reading writing on the record medium, said writing checking system comprising an output terminal; a first circuit coupled to the read head and connected to the output terminal for producing an error signal at the output terminal if a read signal is read during a first period of time T1 after the start of writing recorded on the record medium; a second circuit connected to the first circuit for producing an error signal at the output terminal if no read signal is read after the expiration of a second period of time T2 after the expiration of the first period of time T1; a first input terminal for supplying a write stop command; a third circuit connected to the first input terminal and the second circuit for producing an error signal at the output terminal if no read signal is read during the first period of time T1 after the end of writing recorded on the record medium; and a fourth circuit connected to the third circuit and first circuit for producing an error signal at the output terminal if a read signal is read after the expiration of the second period of time T2 after the expiration of the first period of time T1.

2. A writing checking system as claimed in claim 1, further comprising a second input terminal for supplying a write start command, and wherein the first circuit comprises a first delay circuit having an output and an input coupled to the read head and to the second input terminal for providing a delay time equal to the first period of time T1, said first delay circuit being energized by a write start command at the second input terminal, a first OR gate having an output, a first input connected to the output of the first delay circuit and a second input coupled to the read head, a first flip flop having a set input, a reset input connected to the output of the first delay circuit and a set output, read start means connected to the set input of the first flip-flop for supplying a read start signal thereto, a first And gate having a first input, a second input connected to the set output of the first flip flop and an output, read signal means connected to the first input of the first AND gate for supplying read signals thereto, and a second OR gate having a first input connected to the output of the first AND gate, a second input and an output connected to the output terminal.

3. A writing checking system as claimed in claim 2, further comprising an inverter having an input connected to said read signal means and an output, and wherein the second circuit comprises a second delay circuit having an input connected to the output of the first delay circuit of the first circuit and an output for providing a delay time equal to the second period of time T2, said second delay circuit being energized by the output of the first delay circuit, a second flip flop having a set input connected to the output of the second delay circuit, a reset input coupled to the first input terminal and a set output, and a second AND gate having a first input connected to the output of the inverter, a second input connected to the set output of the second flip flop and an output connected to the second input of the second OR gate of the first circuit.

4. A writing checking system as claimed in claim 3, wherein the third circuit comprises a third delay circuit having an input connected to the first input terminal and an output for providing a delay time equal to the first period of time T1, said third delay circuit being energized by a write stop command at the first input terminal, the second flip flop of the second circuit, the output of the third delay circuit being connected to the reset input of the second flip flop, the second AND gate of the second circuit, and the second OR gate of the first circuit.

5. A writing checking system as claimed in claim 4, wherein the fourth circuit comprises a fourth delay circuit having an input connected to the output of the third delay circuit of the third circuit and an output for providing a delay time equal to the second period of time T2, said fourth delay circuit being energized by the output of the third delay circuit, a third OR gate having a first input connected to said read signal means, a second input connected to the output of the fourth delay circuit and an output connected to the set input of the first flip flop of the first circuit, the first AND gate of the first circuit, and the second OR gate of the first circuit.

* * * * *